US008827613B2

(12) United States Patent
Liao

(10) Patent No.: US 8,827,613 B2
(45) Date of Patent: Sep. 9, 2014

(54) FLAT CUSHIONING AIR BAG FOR CARGO CONTAINER WITH A PLURALITY OF INNER PARTITIONED AIR CHAMBERS

(71) Applicant: Air-Bag Packing Co., Ltd., New Taipei (TW)

(72) Inventor: Yaw-Shin Liao, New Taipei (TW)

(73) Assignees: Air-Bag Packing Co. Ltd., New Taipei (TW); Yaw-Shin Liao, New Taipei (TW)

( * ) Notice: Subject to any disclaimer, the term of this patent is extended or adjusted under 35 U.S.C. 154(b) by 0 days.

(21) Appl. No.: 13/911,523

(22) Filed: Jun. 6, 2013

(65) Prior Publication Data
US 2014/0010612 A1    Jan. 9, 2014

(30) Foreign Application Priority Data

Jul. 6, 2012  (TW) .............................. 101124479 A

(51) Int. Cl.
*B60P 7/08*        (2006.01)
*B60P 7/06*        (2006.01)

(52) U.S. Cl.
CPC ..................................... *B60P 7/065* (2013.01)
USPC ....................................................... 410/119

(58) Field of Classification Search
CPC .............. B60P 7/065; B60P 7/14; B60P 7/16; B65D 81/052; A47C 27/10; A61G 7/05769; A61G 7/05776
USPC ................... 410/87, 119, 125; 383/3, 38, 94; 206/522, 593; 5/708, 710, 711; 428/178

See application file for complete search history.

(56) References Cited

U.S. PATENT DOCUMENTS 5,730,564 A  *  3/1998  Howlett, Jr. ................... 410/119
6,671,910 B2 *  1/2004  Hsu et al. ......................... 5/710

* cited by examiner

*Primary Examiner* — Stephen Gordon
(74) *Attorney, Agent, or Firm* — Muncy, Geissler, Olds & Lowe, P.C.

(57) ABSTRACT

A flat cushioning air bag for cargo container with a plurality of inner partitioned air chambers, comprises: inner films, stuck together to form a main air chamber by hot sealing; a valve device, coupled to the main air chamber, allowing air to be filled into the main air chamber; connecting films, positioned between the outer films; connecting lines, coupling the outer films to the connecting films, and connecting films being adapted to partition the main air chamber; and inner partitioned air chambers, formed among the outer films and connecting films. A curved portion is formed on each outer film between each two adjacent connecting lines when the inner partitioned air chambers are filled with air and expanded, and the curved portions are tangent to the same plane, allowing each outer film to be in multi-point contact with an object surface to provide the object with cushioning protection.

8 Claims, 12 Drawing Sheets

FLAT CUSHIONING AIR BAG FOR CARGO CONTAINER WITH A PLURALITY OF INNER PARTITIONED AIR CHAMBERS

CROSS-REFERENCES TO RELATED APPLICATIONS

This non-provisional application claims priority under 35 U.S.C. §119(a) on Patent Application No. 101124479 filed in Taiwan, R.O.C. on Jul. 6, 2012, the entire contents of which are hereby incorporated by reference.

BACKGROUND OF THE INVENTION

1. Technical Field

The present invention relates to a cushioning air bag for cargo container, and more particularly to a flat cushioning air bag for cargo container with a plurality of inner partitioned air chambers.

2. Related Art

Cushioning air bags are mainly used to fill in paper boxes or cargo containers so as to serve as a partition between two adjacent cargos, thereby preventing cargos inside a paper box or container from shaking, toppling over or scattering during transportation.

Please refer to FIGS. 1 and 2, in which a general conventional cushioning air bag A1 is formed by sticking two sheets of plastic film A10 by means of hot sealing, together with air is filled inside the cushioning air bag, causing the air bag A1 to be expanded to a degree enough to generate a cushioning function; a curved surface A11 will be respectively formed naturally on the two sides of the air bag A1 after being expanded. Consequently, the curved surfaces A11 on the two sides of the air bag A1 can respectively touch two adjacent cargos to eliminate a gap between them after the air-filled cushioning air bag is stuffed between the two adjacent cargos, and the air bag A1 itself can generate elasticity naturally Because a central portion A12 of the curved surface A11 of the conventional cushioning air bag A1 is more protruding, the cargo A8 is compressed by the cushioning air bag A1 with the central portion A12 of the curved surface A11 such that one-single-point contact is formed. The cargo A8 is easy to deform distortedly under the compression of the central portion A12 of the curved surface A11 in a long term, and objects inside the cargo A8 are even influenced or damaged since the cargos A8 mostly are paper boxes for package.

SUMMARY

To improve the deficiencies of conventional air bags mentioned above, the present invention is proposed. The present invention proposes a flat cushioning air bag for cargo container with a plurality of inner partitioned air chambers, including: a plurality of outer film, stuck together to form a main air chamber by means of hot sealing; an air valve device, coupled to the main air chamber, allowing air to be filled into the main air chamber; a plurality of connecting films, positioned between the plurality of outer films; a plurality of connecting lines, coupling the plurality of outer films to the plurality of connecting films, the plurality of connecting films being adapted to partition the main air chamber; and a plurality of inner partitioned air chambers, formed among the plurality of outer films and the plurality of connecting films. The plurality of outer films are respectively formed into a plurality of curved portions between the all two adjacent connecting lines after the plurality of inner partitioned air chambers are filled with air and expanded, and the plurality of curved portions are tangent to the same plane, allowing the plurality of outer films to be in multi-point touch with a surface of an object, thereby to provide the object with cushioning protection.

The present invention uses the connecting films to couple the plurality of outer films to each other, allowing the outer film to be changed from one originally formed curved face to multiple curved portions during air filling and expansion. Furthermore, the plurality of connecting lines may be configured in a unequal interval or equal interval way depending on requirements. If the equal interval way is adopted, the plurality of curved portions have the same curvature and are tangent to the same plane. Since the outer films are stuck to each other vertically by means of hot sealing through the plurality of connecting films, the outer films are limited to expand outward during air filling, and a flat air sealing body having a plurality of inner partitioned air chambers is formed after air filling. Consequently, the present invention can use the plurality of curved portions to prop against an object to form a surface in multi-point touch with the object, thereby solving the deficiency found in conventional cushioning air bag that an object is deformed distortedly due to the single-point compression on the object.

BRIEF DESCRIPTION OF THE DRAWINGS

The present invention can be more fully understood by reference to the following description and accompanying drawings, in which.

DETAILED DESCRIPTION

Figure 1:
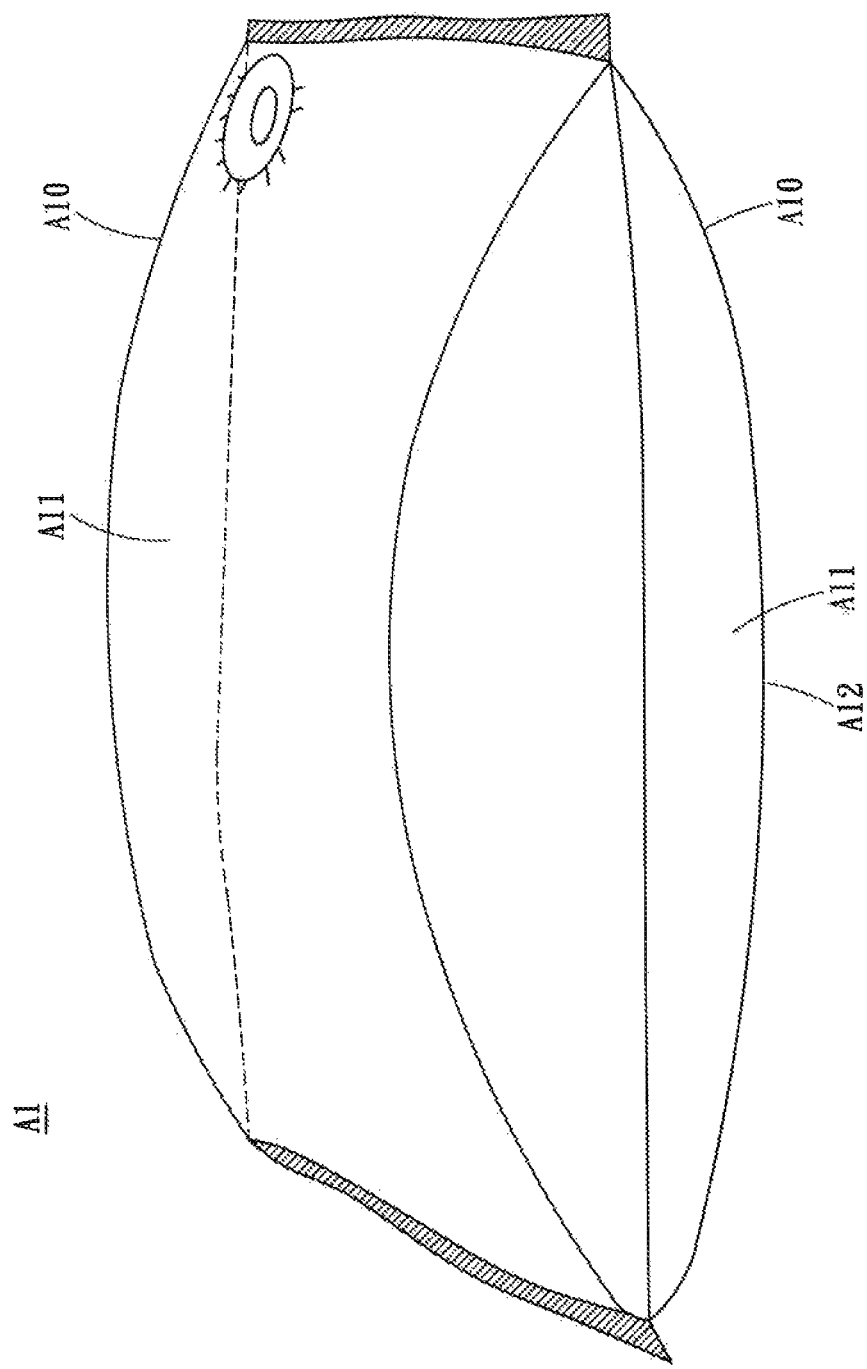
FIG. 1 is a perspective view of a conventional air bag.
Figure 2:
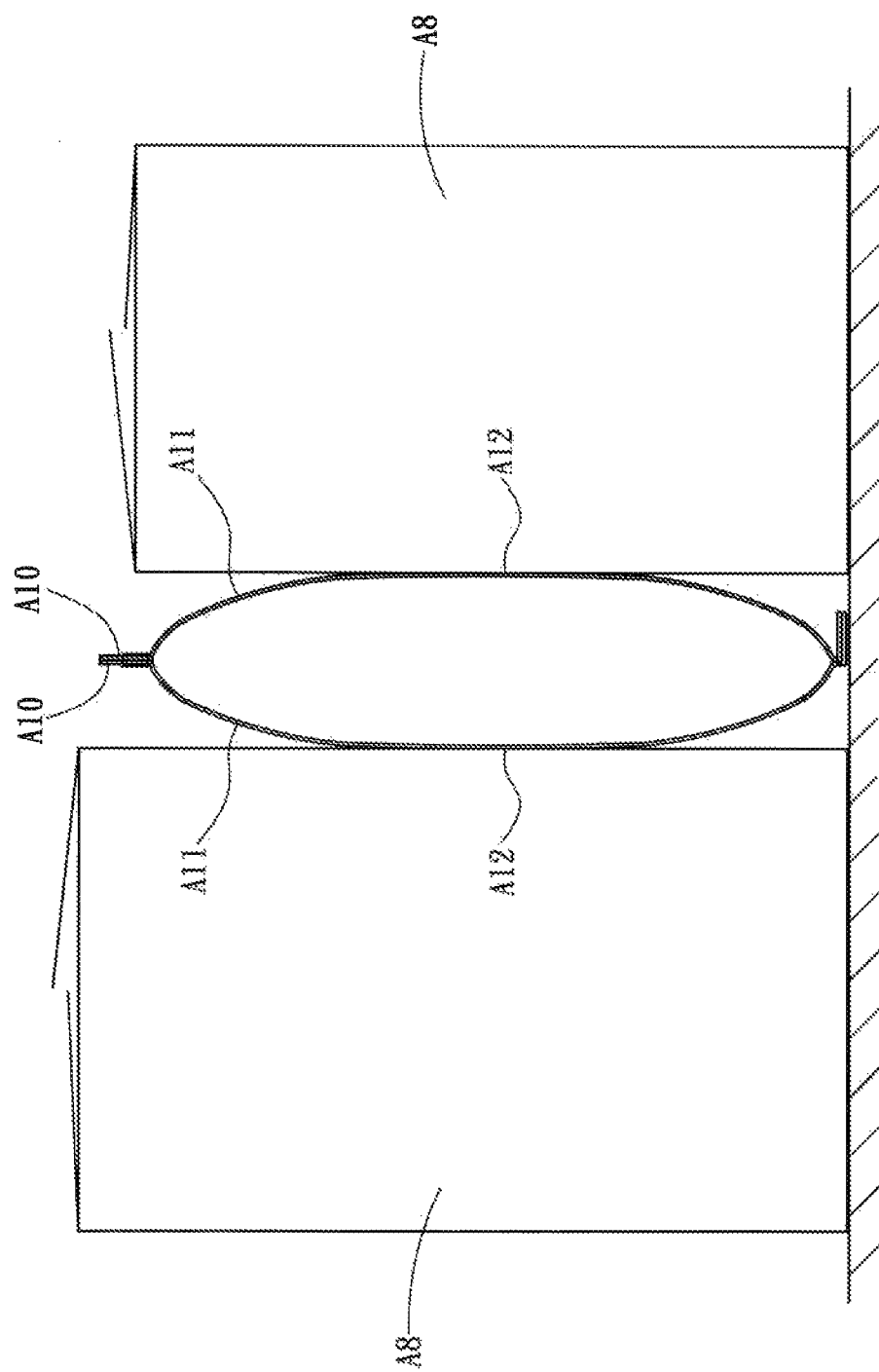
FIG. 2 is a schematic view of a conventional air bag in use.
Figure 3:
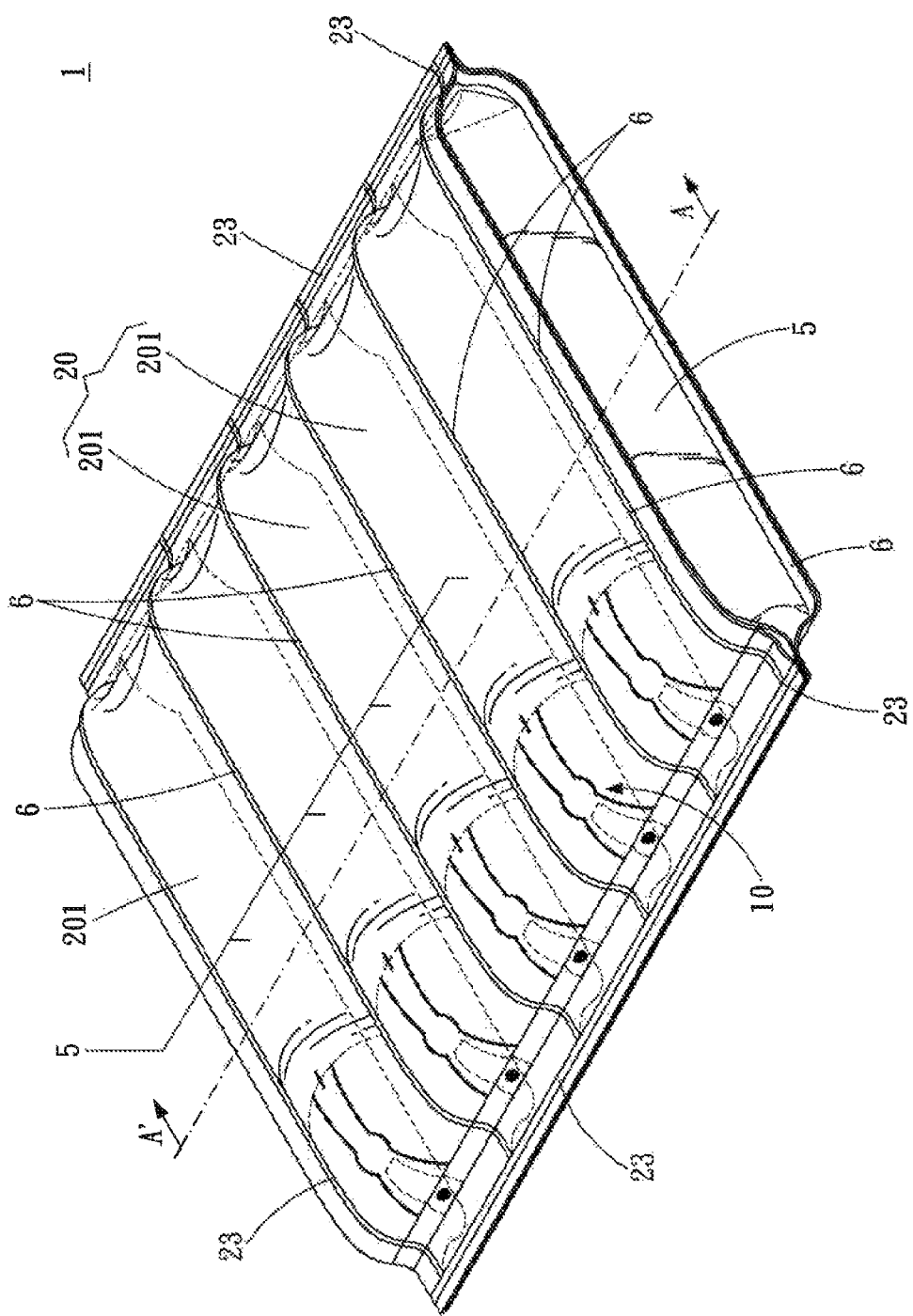
FIG. 3 is a perspective view of a first embodiment according to the present invention.
Figure 4:
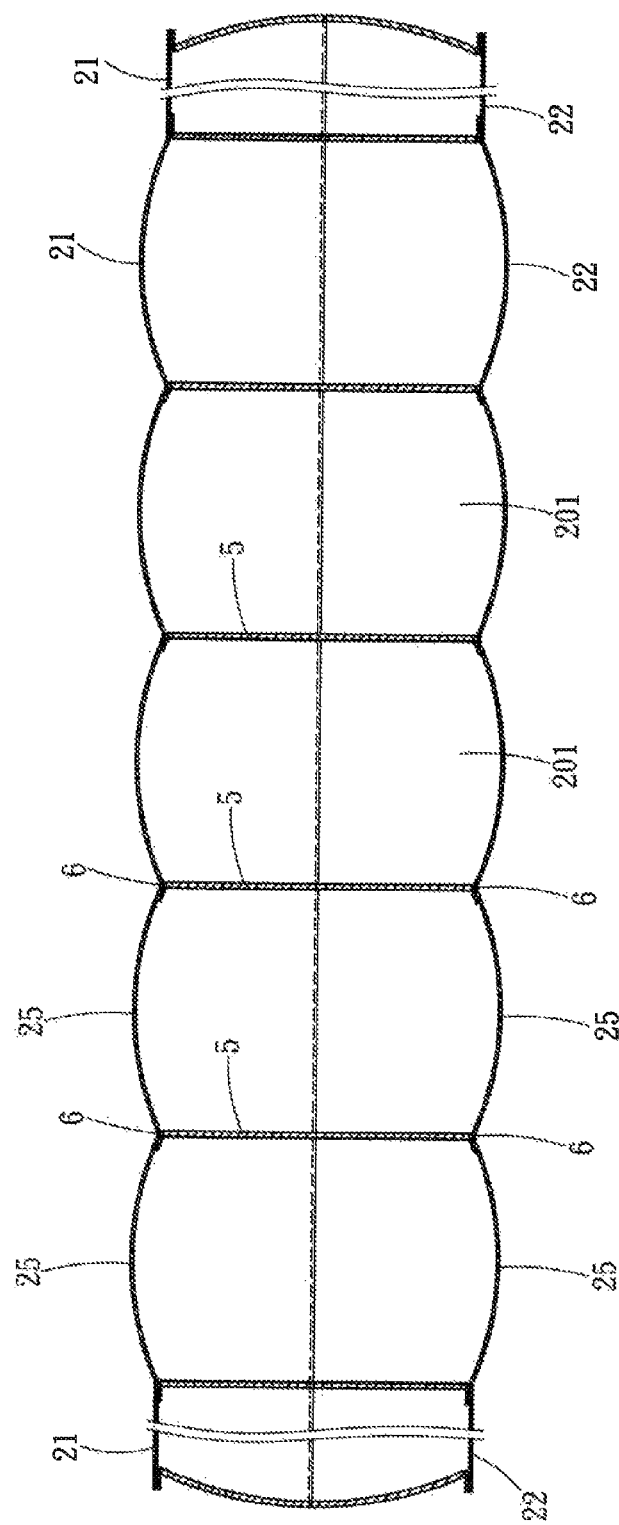
FIG. 4 is a cross-sectional view taken along line A-A' of FIG. 3.

Please refer to FIGS. 3 and 4, which show a flat cushioning air bag for cargo container with a plurality of inner partitioned air chambers of a first preferred embodiment according to the present invention.

A flat cushioning air bag 1 for cargo container with a plurality of inner partitioned air chambers of the present invention includes two sheets of outer film 21 and 22, an air valve devices 10, a plurality of connecting films 5 and a plurality of connecting lines 6.

The two sheets of outer film 21 and 22 are stacked together, the plurality of connecting films 5 are positioned between the two sheets of outer film 21 and 22, and the two sides of each connecting film 5 are respectively stuck to the two sheets of outer film 21 and 22 through the connecting lines 6 by means of hot sealing. Two ends of the two sheets of outer film 21 and 22 are stuck together through connecting lines 23 formed by means of hot sealing after the plurality of connecting films 5 are stuck to the two sheets of outer film 21 and 22, allowing a main air chamber 20 to be formed by the two sheets of outer film 21 and 22, and a plurality of inner partitioned air chambers 201 are formed by the plurality of inner connecting films 5 contained in the main air chamber 5, as FIGS. 3 and 4 show. In another word, the two sheets of outer film 21, 22 and each two adjacent connecting films 5 define each of the plurality of inner partitioned air chambers 201. In the present embodiment, the inner partitioned air chamber 201 approximately is a rectangular space, and the connecting film 5 is just like a support in the space.

In the embodiment, since the connecting film 5 is equal to the outer film 21 (22) in length, the main air chamber 20 can be divided into the plurality of independent inner partitioned air chambers after the hot sealing sticking of the connecting lines. In another pattern of the embodiment, a through hole 51 may further be configured on each connecting film 5, adapted to connect the plurality of independent inner air chambers 201 with one another. In the embodiment, each air channel 12 corresponds to one of the plurality of inner partitioned air chambers 201 if the plurality of inner partitioned air chambers 201 are independent of one another so that air can be filled into each inner partitioned air chamber 201 through the corresponding air channel 12.

Please refer again to FIG. 4, in which embodiment, the plurality of connecting lines 6 may be arranged equidistantly and connect the two sheets of outer film 21, 22 with the plurality of connecting films 5; namely, one end of the connecting film 5 is stuck to the outer film 21 by means of hot sealing through the connecting line 6 and another end thereof is stuck to the outer film 22 by means of hot sealing through the connecting line 6. However, in the other embodiments the plurality of connecting lines may be not arranged equidistantly. Since the two sheets of outer film 21, 22 are stuck to the connecting films 5 through the connecting lines 6, the outward expansion of the two sheets of outer film 21, 22 is limited during air filling so that the two sheets of outer film 21, 22 are not protruded outward with the whole sheet upon the air filling expansion, but form a curved portion 25 between every two adjacent connecting lines 6 instead.

Furthermore, the plurality of curved portions 25 have the same curvature and are tangent to the same plane, in another word, each curved portion 25 has the curve length and the degree of the protrusion thereof is the same such that all the curved portions 25 will be tangent to the same plane. In addition, since the plurality of connecting lines 6 may be arranged equidistantly and the plurality of the connecting films 5 are configured parallel to one another between the two sheets of outer film 21 and 22, the plurality of curved portions 25 on the outer film 21 correspond to the plurality of curved portions 25 on the outer film 22.

Figure 6A:
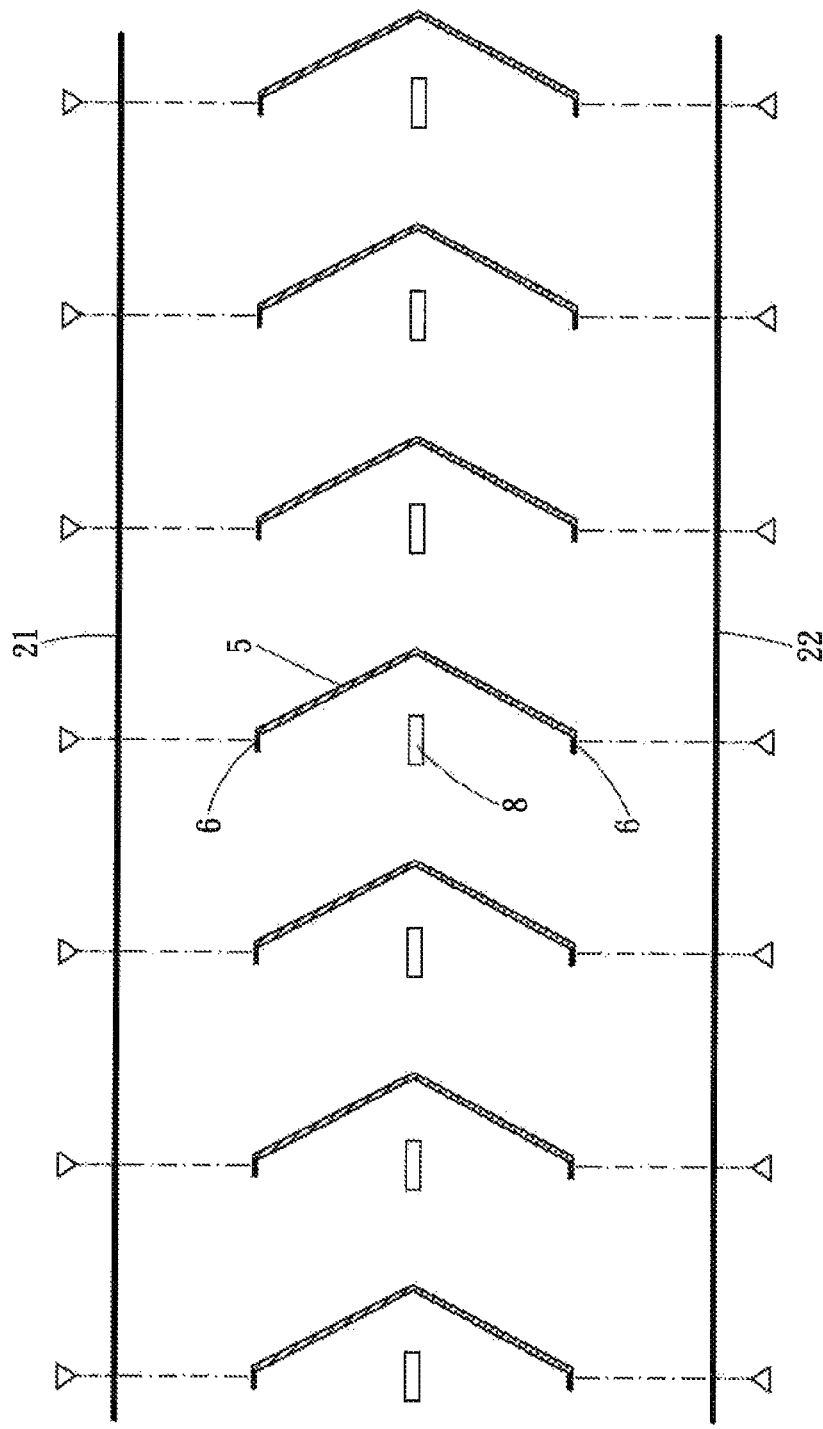
FIG. 6A is a schematic view of a connecting film of the first embodiment according to the present invention upon hot sealing.

Please refer to FIG. 6A, in which embodiment the plurality of connecting films 5 are positioned between the two sheets of outer film 21 and 22, bended in advance and is configured with a heat-resistant sheet 8 between each two adjacent connecting films 5, and stuck by means of hot sealing to form the connecting lines 6; one end of the connecting film 5 will be allowed to stick to the outer film 21 by means of hot sealing through the connecting line 6 at one face of the heat-resistant sheet 8, and another end of the connecting film 5 will be allowed to stick to the outer film 22 by means of hot sealing through the connecting line 6 at another face of the heat-resistant sheet 8. In addition, the heat-resistant sheet 8 is used to prevent the bended connecting films 5 from being stuck together by means of hot sealing. The configuration of the heat-resistant sheets 8 mentioned above is only an example, the present invention is not so limited; heat-resistant ink may be spread between each two adjacent bended connecting films 5 instead of the heat-resistant sheet 8 besides the heat-resistant sheet 8 is configured between each two adjacent bended connecting films 5.

Figure 6B:
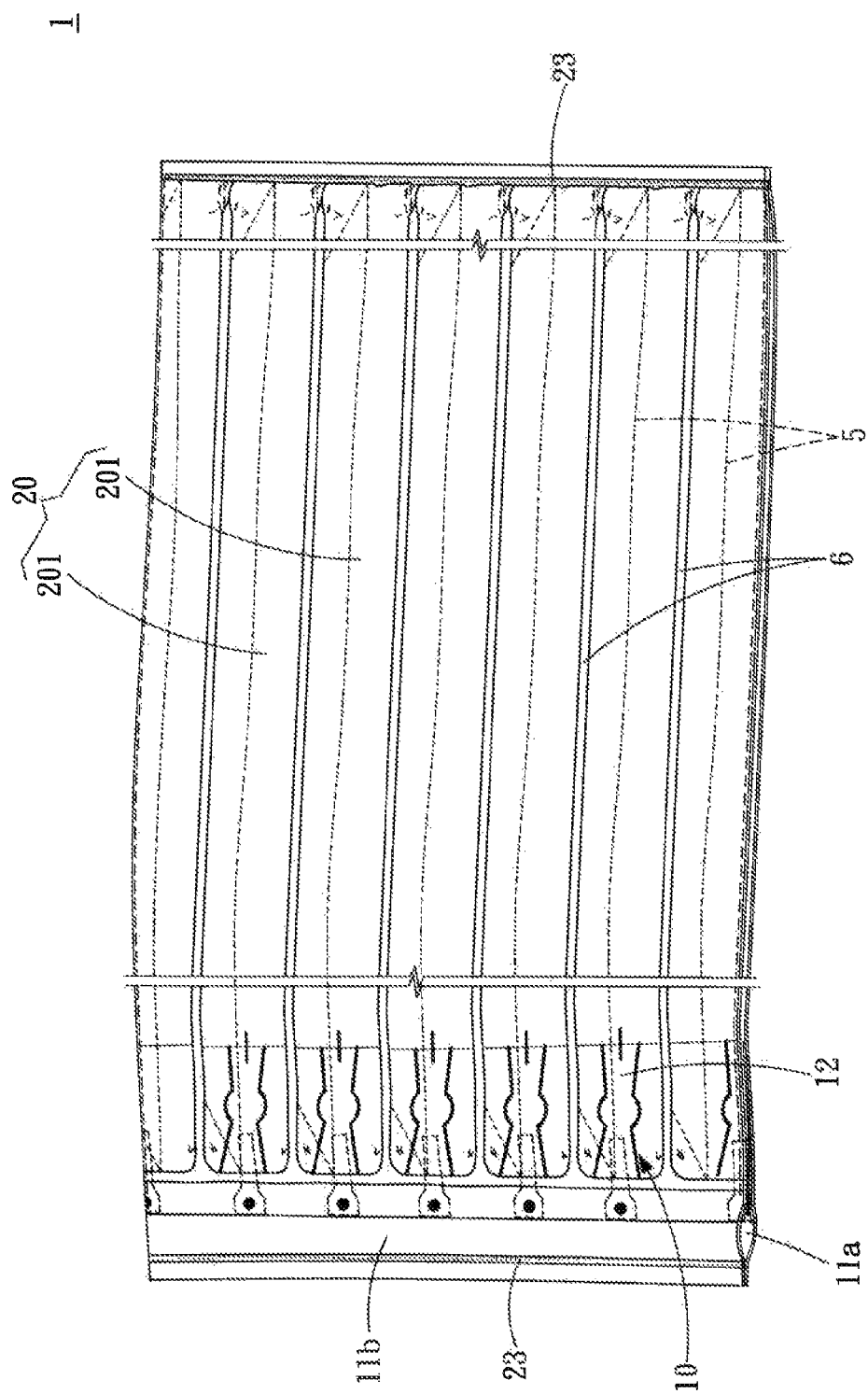
FIG. 6B is a plan view of the first embodiment according to the present invention.

Please refer to FIGS. 6A and 6B, in which air enters an air filling passageway 11b of the air valve device 10 formed by stacking two sheets of inner film 1a and 1b together, causing the two sheets of inner film to be pulled apart outward, thereby to open each air channel 12, and air may then be filled into and expand the main air chamber 20 or each inner partitioned air chamber 201 via each air channel 12. Subsequently, the air in the main air chamber 20 or each inner partitioned air chamber 201 compress the two sheets of inner film 1a and 1b to attach to each other to seal the air channel 12 after the air filling and expansion, allowing the air not to flow back or leak via the air channel 12. The two sheets of outer film 21, 22 will formed into curved portions 25 between all the two adjacent connecting lines 6 during the air filling and expansion, and the plurality of curved portions 25 are tangent to the same plane. Consequently, the whole flat cushioning air bag 1 for cargo container approximately is a flat body, allowing the two sheets of outer film 21, 22 to be in multi-point touch with the surface of an object 9 to provide the object 9 with cushioning protection.

Figure 9:
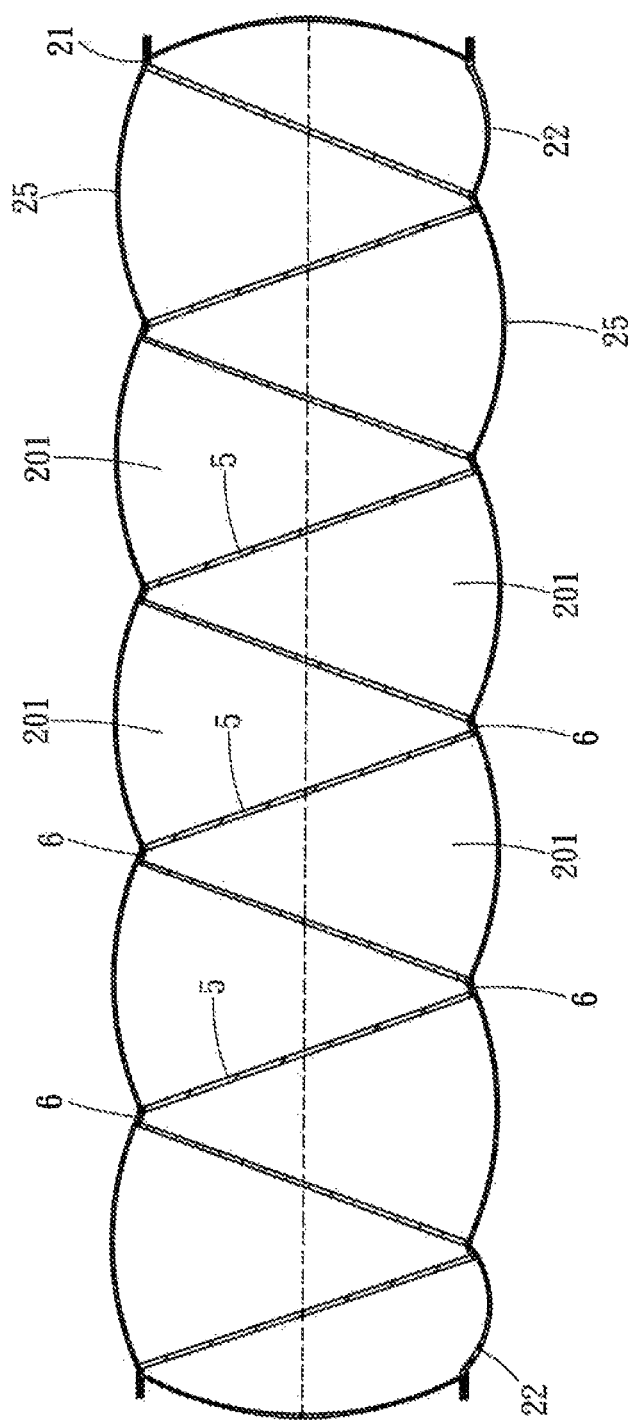
FIG. 9 is a cross-sectional view of a second preferred embodiment according to the present invention.

Please refer to FIG. 9, which illustrates a cross-sectional view of a flat cushioning air bag for cargo container with a plurality of inner partitioned air chambers of a second preferred embodiment according to the present invention. The greatest difference between the present embodiment and the first embodiment is the arrangement of the connecting films 5. In the present embodiment, one end of the connecting film 5 is coupled to one end of another connecting film 5 so that the connecting films 5 coupled together is a continuous V-typed body as a whole. Since the plurality of connecting lines 6 may be arranged equidistantly, and the plurality of connecting films 5 is the continuous V-typed body and configured between the two sheets of outer film 21 and 22, the plurality of curved portions 25 on the outer film 21 are staggered with the plurality of curved portions 25 on the outer film 22. Other structures are as described above, and not mentioned here.

Figure 10:
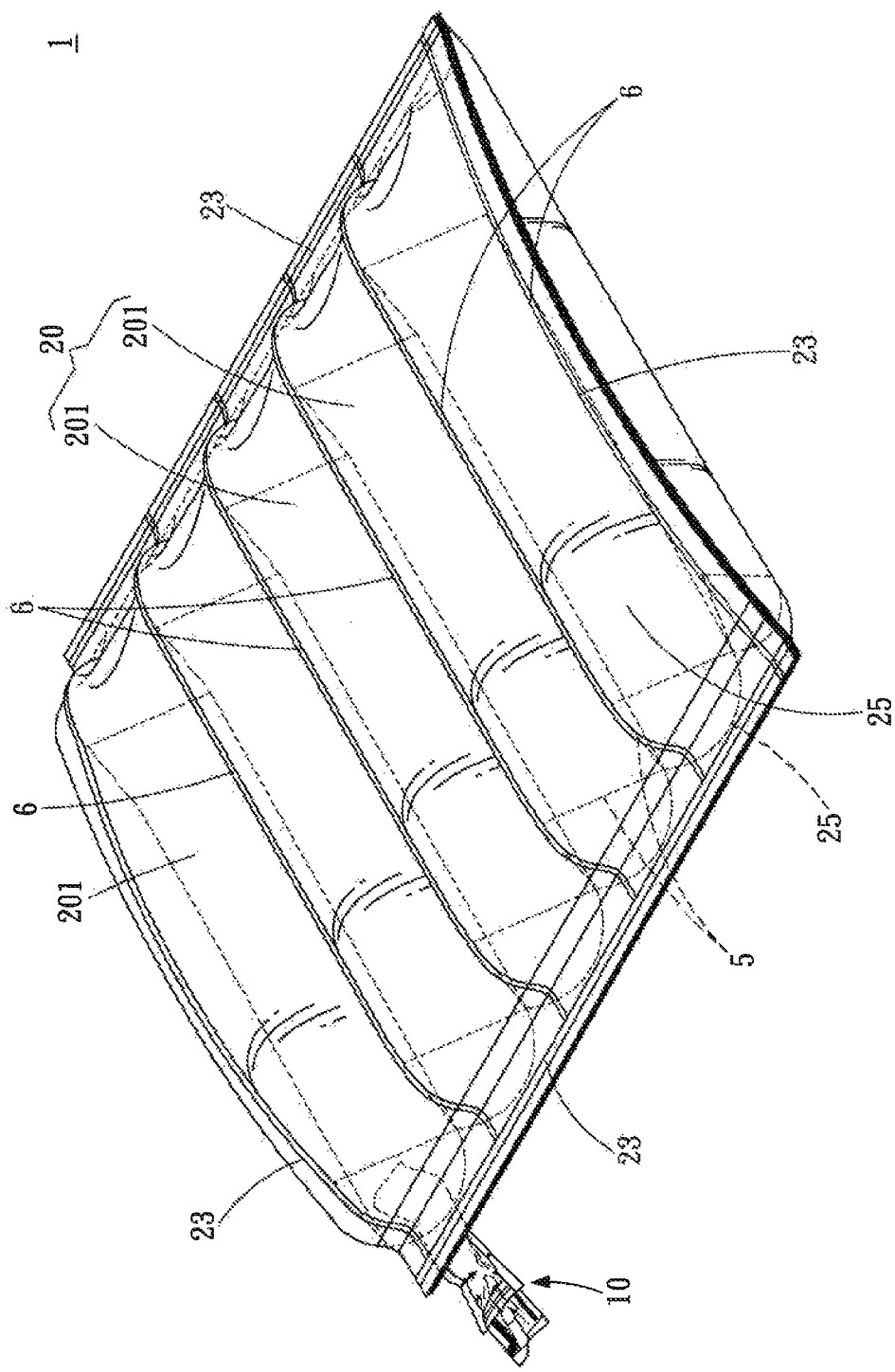
FIG. 10 is a perspective view of a third preferred embodiment according to the present invention.

Please refer to FIG. 10, which is a perspective view of a third preferred embodiment according to the present invention. The primary difference between the present invention and the first embodiment lies in an outer film structure. In the present embodiment, the rim of the outer film 21 and the rim of the outer film 22 are stuck together by forming a connecting line 23 by means of hot sealing, allowing the four sides of the outer film 21 to be coupled to the corresponding sides of the outer film 22 to form the main air chamber 20. Other structures are as described above, not mentioned here.

Figure 11:
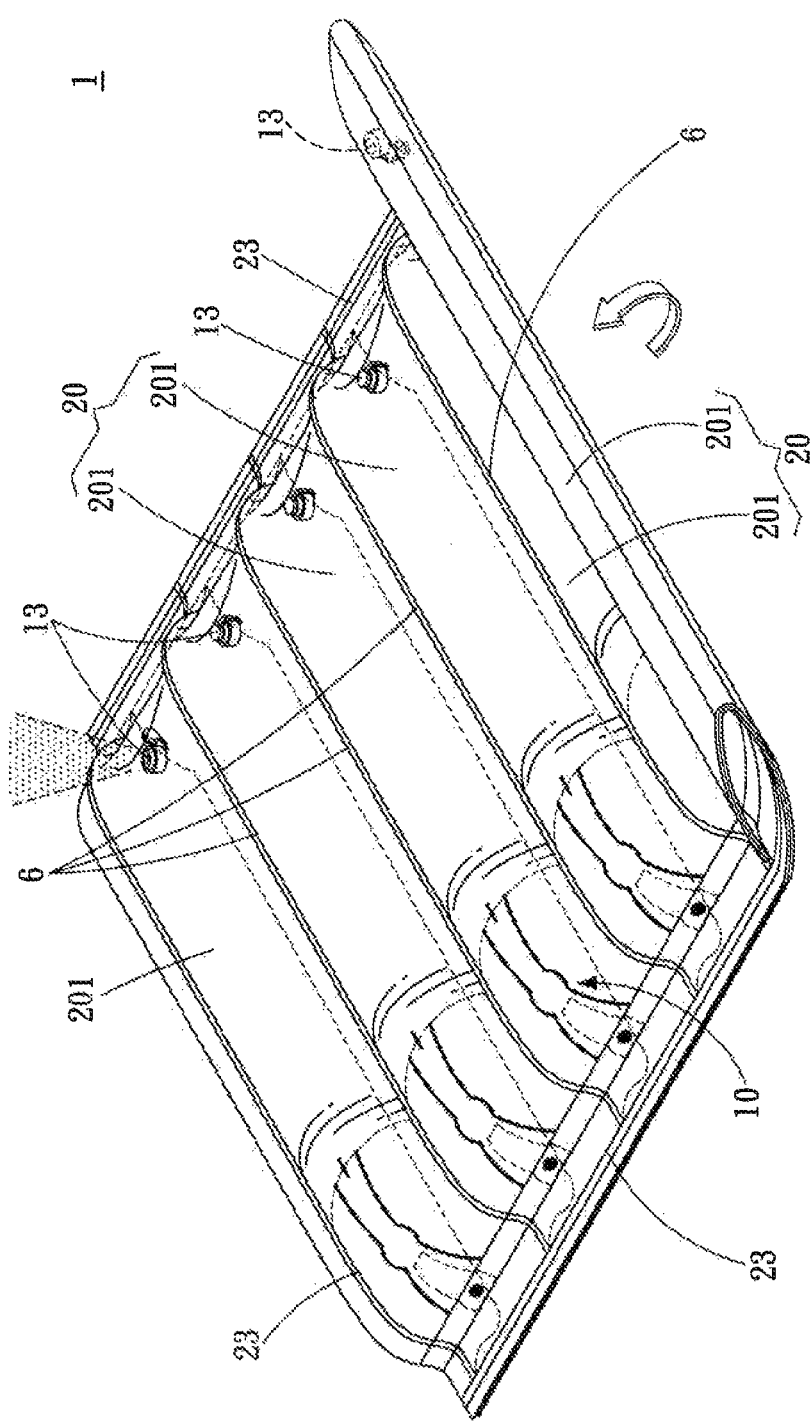
FIG. 11 is another perspective view of the third embodiment according to the present invention.

Please refer again to FIG. 10, in which in another pattern, the connecting film 5 is shorter than the outer film 21 (22) such that the plurality of inner partitioned air chambers 201 are connected to one another, only one single air channel 12 may be disposed on the air valve device, and air filling can then be carried out to all the partitioned air chambers 201. However, in other embodiments, the plurality of inner partitioned air chambers 201 may also be independent of each other such the air cannot communicate with one another. Please refer to FIG. 11, in which the air valve device 10 may be a continuous air valve structure having a plurality of air channels 12, and air filling can then be carried out to all the inner partitioned air chambers 201 simultaneously. In other embodiments, the plurality of inner partitioned air chambers 201 respectively have an air valve device 10 with an air tap structure, e.g. air valve switching device 13 for plastic material (see FIG. 11), when they are independent of one each other so that air exhausting out of each inner partitioned air chamber 201 can be carried out through the independent air valve switching device 13 thereof. In this pattern of the embodiment, the air valve can be used independently for air filling into each inner partitioned air chamber 201, and the air valve switching device 13 can be used independently for air exhausting out thereof; allowing the air filling state in the other inner partitioned air chambers 201 not to be affected when any inner partitioned air chamber 201 is damaged. Furthermore, in some other embodiments, the air valve device 10 may be an exhaust valve structure adapted to discharge the air in the independent inner partitioned air chamber 201 whereby the air bag can be furled for storage after the air in every inner partitioned air chamber 201 is exhausted.

Figure 7:
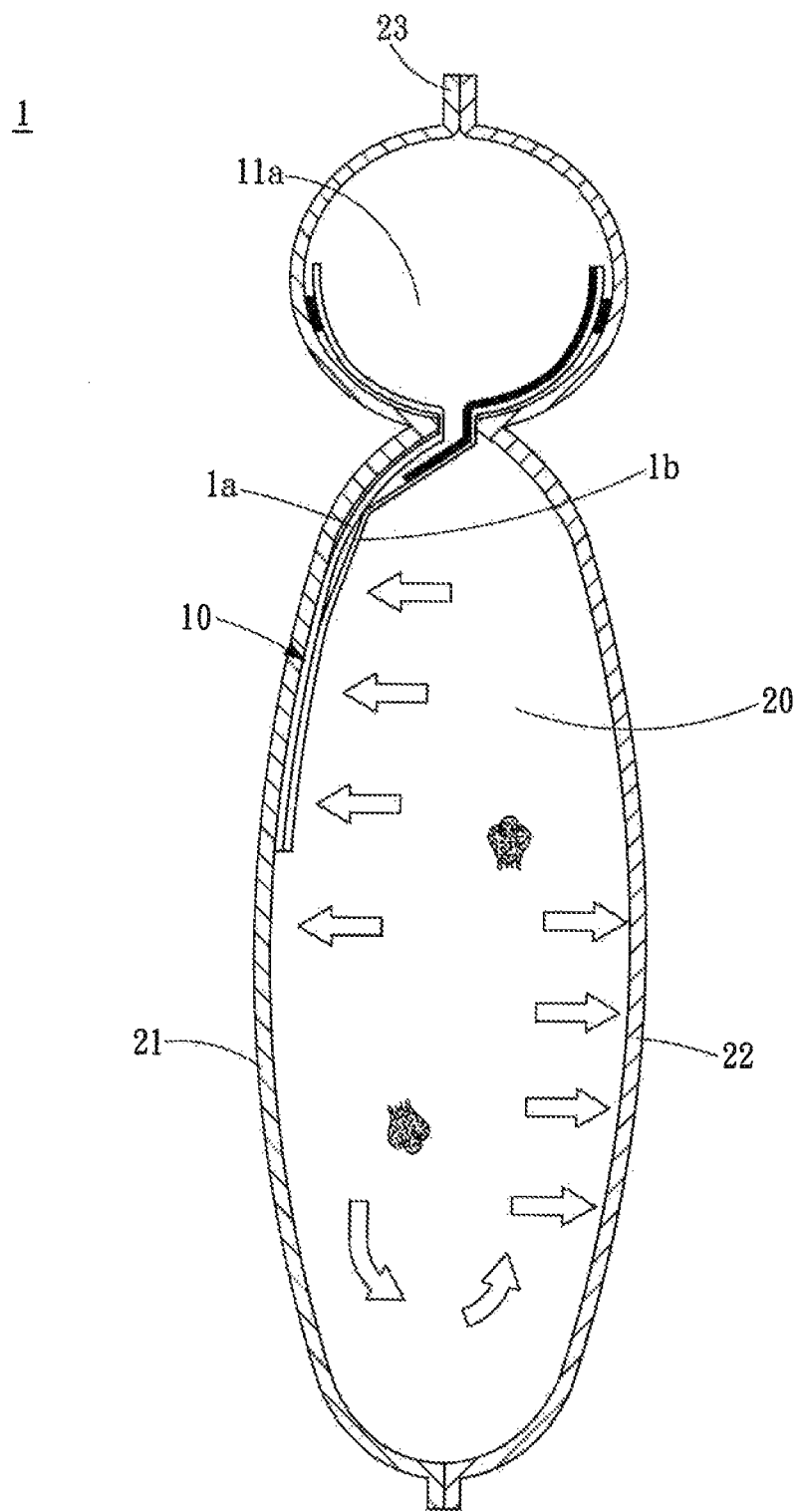
FIG. 7 is a schematic view of the first embodiment according to the present invention in an air-filling state.
Figure 8:
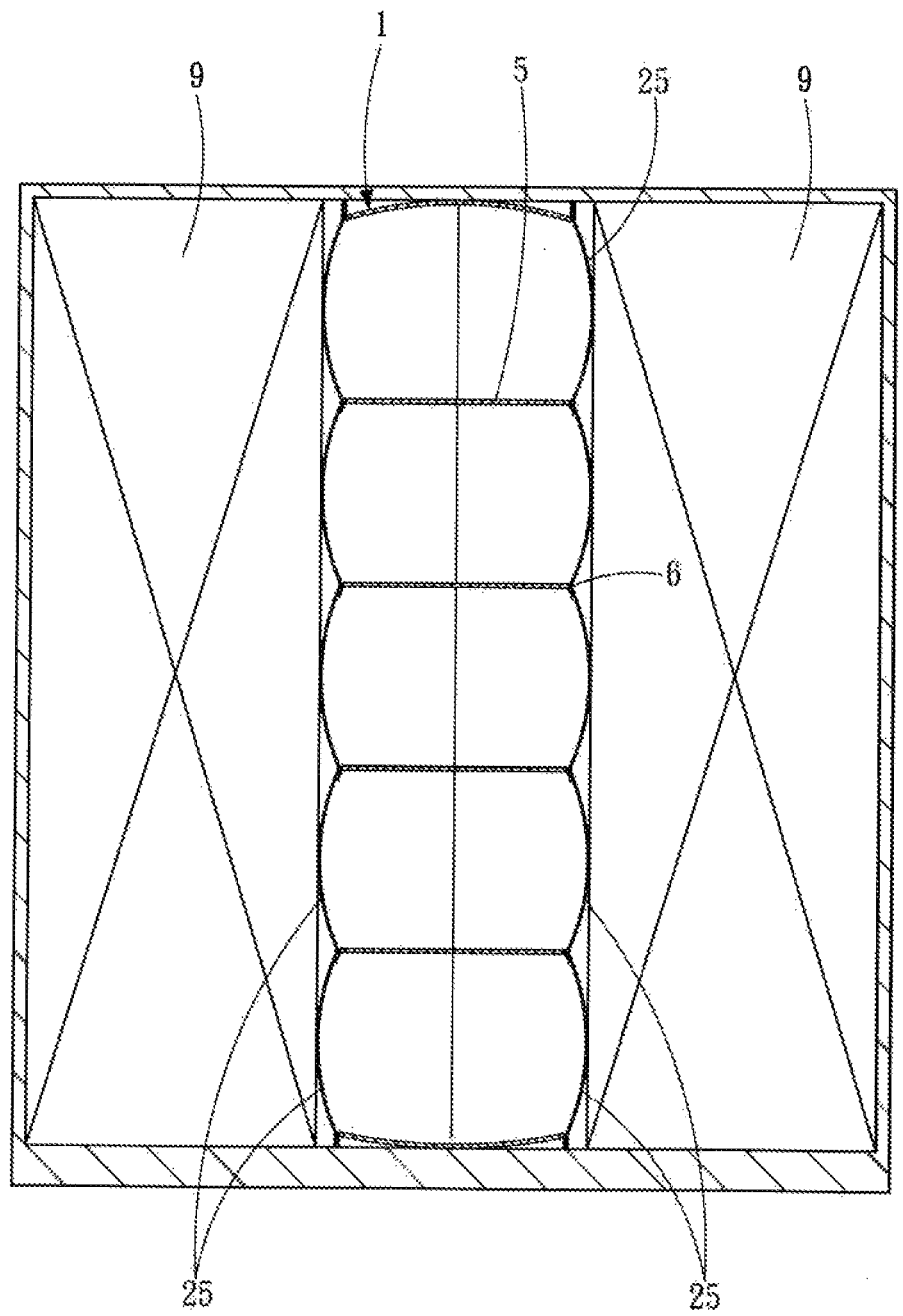
FIG. 8 is a schematic of the first embodiment according to the present invention in use.

The air valve device 10 mentioned above is for example only; the present invention is not so limited. In different embodiments, the air valve device 10 may be applied to every kind of plastic material (e.g. thin film), or paper bag, and may be a different type depending on practical uses:

(1) the air valve device 10 is a continuous structure of the independent one-way check valve of each air chamber, i.e. a film sheet constituted by the two sheets of inner film 1a, 1b is configured on the any one of the two sheets of outer film 21, 22, which can be referred to FIGS. 3, 6B and 7. The two sheets of inner film 1a, 1b are stuck to the outer film 21 or 22 by means of hot sealing to form an air filling entrance 11a, air filling passageway 11b and air channels 12, and one side of the outermost connecting film 5 is then combined and hot-sealed to form the external air filling entrance 11a. Air flows into each air channel 12 and is filled in the respective inner partitioned air chamber 201 combined by each connecting film 5, the upper and lower connecting lines 6, and the upper and lower outer films after entering the air filling passageway 11b via the air filling entrance 11a, where the outermost connecting films 5 are expanded and form side films on the two sides after the air filling.

Figure 5:
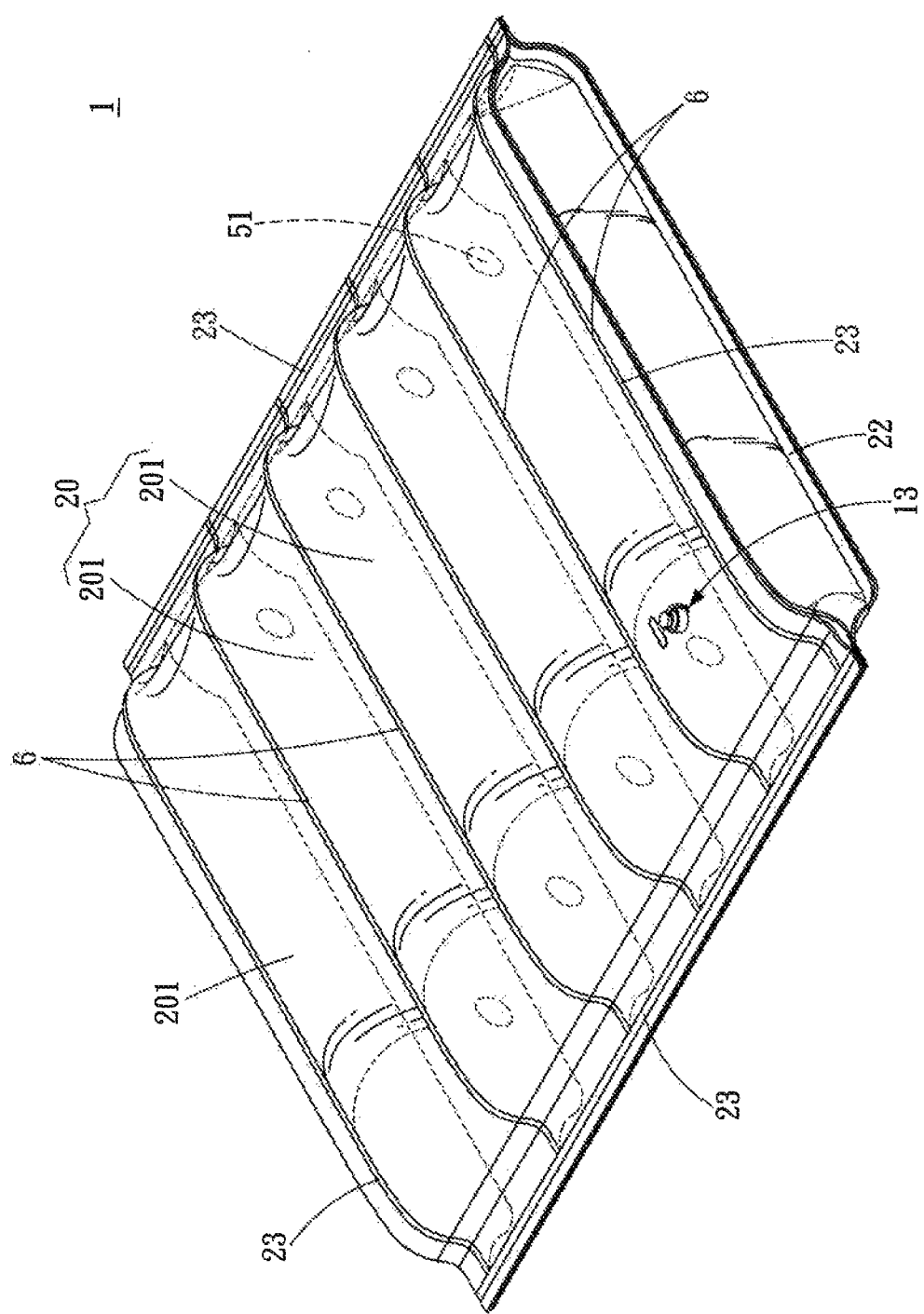
FIG. 5 is a perspective view of another pattern of the first embodiment according to the present invention.

(2) the air valve switching device 13 of the air valve device 10 is an air filling device, and may be an air filling valve/air exhausting structure with a piston composed of plastic material, configured on the outer film 21 or 22. Upon air filling, the piston of the air valve switching device 13 is opened, the air filling can be carried out. To allow each inner partitioned air chamber 201 formed by each connecting film 5 and the two sheets of outer film 21, 22 to be filled with air, the through hole 51 may be formed on each connecting film 5 in advance (see FIG. 5), allowing the inner partitioned air chambers to be connected to one another and the air not to flow out of the main air chamber 20. Furthermore, the piston is closed, the air can then be locked after the air filling, and in a reverse operation, the piston is opened and the air can then be discharged upon air exhausting.

(3) the air valve device 10 is replaced with a soft air filling device constituted by two plastic film pieces, configured on a position where the two sheets of outer film 21, 22 are coupled to each other or any connecting film 5 is coupled to the outer film 21 or 22. The heat-resistant node is spread on the inner faces of the plastic film pieces in advance, and the locations where the heat-resistant node is spread will not be stuck together when the soft air filling device is placed between the two sheets of outer film 21, 22 or connecting film 5 and are then stuck together by means of hot sealing so that a breach can be formed. Whereby, air can be filled via this breach. Subsequently, the inner air pressure of the main air chamber 20 will compress the two plastic film pieces to lock the air automatically after the air filling, as FIG. 10 shows.

Since a sealing body is an air storable space formed by sealing upper, lower, right and left sides thereof by means of hot sealing, the present invention introduces the two sheets of outer film stacked together vertically, in which the plurality of connecting films coupled to the upper, lower outer films are placed. The two sides of each connecting films are respectively stuck to the two sheets of outer film by means of hot sealing to form a plurality of quadrilateral air chambers, and the front, rear tail ends of the two sheets of outer film are hot-sealed so as to form an air sealing body with a plurality of inner partitioned air chambers.

Since the areas of the outer film are larger, and the area of the connecting film is small, the outer film is divided into several small-area bodies through the connecting lines, the methods for configuring the connecting film may have the followings:

(1) the plurality of independent connecting films are configured parallel to one another between the two outer films, allowing the two sides of each connecting film are respectively stuck to the upper and lower outer films by means of hot sealing to form a plurality of similarly divided rectangular bodies parallel to one another.

(2) the continuous connecting films each is coupled to the upper, lower films obliquely by means of hot sealing to form rectangular bodies in which the upper and lower outer films are not parallel to each other, as FIG. 9 shows. Each rectangular body are stuck to the upper and lower outer films through connecting lines. Furthermore, the connecting film may be coupled to the outer films at the head (tail) to form a quadrilateral body, or the two sheets of outer film and connecting film are stuck together by means of hot sealing at the head (tail) to form a quadrilateral body which is pointed at the head (tail), as FIG. 10 shows.

The method for sticking the connecting film to the two sheets of outer film mentioned above are for example only, the present invention is not so limited, i.e. the connecting film may be a plurality of sheets or continuous sheet, and the included angle between the connecting film and the outer film coupled thereto may be a right angle or a specific angle other than right angle.

The present invention uses the plurality of connecting films to couple to the plurality of outer films allowing one single curve face formed upon the original air-filling expansion of the outer film to be changed to a plurality of curved portions. In addition, the arrangement of the plurality of connecting films may be equidistant or not equidistant; if the equidistant arrangement is adopted, the plurality of curved portions are allowed to have the same curvature so as to be tangent to the same plane. Since the outer film is retained vertically by the plurality of connecting films by means of hot sealing, the outward expansion of the outer film is limited upon air filling so that a flat air sealing body with a plurality of inner partitioned air chambers is formed after air filling. Therefore, the present invention may use the plurality of curved portion to prop against an object, thereby to form a surface in multi-point touch with the object, capable solving the deficiency of conventional cushioning air bags causing an object to be deformed distortedly due to single-point compression on the object.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A cushioning air bag for protecting an object, the cushioning air bag comprising:
   two outer films, stuck together by means of hot sealing to form a main air chamber;
   a plurality of connecting films, positioned between the two outer films and parallel to one another, wherein the two outer films and the plurality of connecting films are connected to each other to form a plurality of connecting lines, the plurality of connecting films divide the main air chamber into a plurality of inner partitioned air chambers, and each inner partitioned air chamber is substantially shaped as a rectangular space;
   a plurality of air valve devices respectively positioned on each of the inner partitioned air chambers, each air valve device comprising an air channel and an air valve switching device, each of the air valve devices allowing each inner partitioned air chamber to fill air into and discharge air out independently; and,
   a plurality of curved portions being formed on the two outer films between each two of the adjacent connecting lines after the inner partitioned air chambers are filled with air and expanded, the plurality of curved portions on one side of the two outer films being tangent to a same one plane, allowing each one of the two outer films to be in multi-point contact with a surface of the object.

2. The flat cushioning air bag according to claim 1, wherein the plurality of curved portions on one of the two outer films corresponds to the plurality of curved portions on another of the two outer films.

3. A cushioning air bag for protecting an object the cushioning air bag comprising:
   two outer films, stuck together by means of hot sealing to form a main air chamber;
   a plurality of connecting films, positioned between the two outer films, the two outer films and the plurality of connecting films are connected to each other to form a plurality of connecting lines, one side of two adjacent ones of the connecting films is coupled to one of the plurality of connecting lines, wherein the plurality of connecting films divide the main air chamber into a plurality of inner partitioned air chambers, wherein one side of the two outermost ones of the connecting films are connected to an edge of the two outer films the main air chamber being substantially shaped as a rectangular space;
   a plurality of air valve devices positioned on the inner partitioned air chambers, each air valve device comprising an air channel and an air valve switching device, and the air valve device allowing the respective inner partitioned air chamber to fill air into and discharge air out independently; and
   a plurality of curved portions, formed on the two outer films after the inner partitioned air chambers are filled with air and expanded, the plurality of curved portions on one side of the two outer films being tangent to a same one plane, allowing one of the two outer films to be in multi-point contact with a surface of the object.

4. The cushioning air bag according to claim 3, wherein the curved portions on one of the two outer films are staggered with the curved portions on another outer film.

5. The cushioning air bag according to claim 1, further comprising an air filling passageway positioned on one side of the main air chamber, each air channel connected to the air filling passageway and also connected to the inner partitioned air chambers on another side.

6. The cushioning air bag according to claim 5, wherein the air channel is unidirectional, allowing air to go into the inner partitioned air chamber only.

7. The cushioning air bag according to claim 3, further comprising an air filling passageway positioned on one side of the main air chamber, each air channel connected to the air filling passageway at one end and connected to the inner partitioned air chambers at another end.

8. The cushioning air bag according to claim 7, wherein the air channel is unidirectional, allowing air to go into the inner partitioned air chamber only.

* * * * *